United States Patent [19]

Clark et al.

[11] 4,404,566

[45] Sep. 13, 1983

[54] FLUID SYSTEM FOR FLUID JET PRINTING DEVICE

[75] Inventors: Frederic L. Clark, Plano; Scott D. Ayers, Garland, both of Tex.

[73] Assignee: The Mead Corporation, Dayton, Ohio

[21] Appl. No.: 355,421

[22] Filed: Mar. 8, 1982

[51] Int. Cl.³ .............................................. G01D 15/18

[52] U.S. Cl. ........................................ 346/1.1; 346/75

[58] Field of Search ........................... 346/1.1, 75, 140

[56] References Cited

U.S. PATENT DOCUMENTS

| | | | |
|---|---|---|---|
| 3,618,858 | 11/1971 | Culp | 346/75 X |
| 3,661,304 | 5/1972 | Martinez | 346/75 X |
| 3,761,953 | 9/1973 | Helgeson et al. | 346/75 |
| 3,891,121 | 6/1975 | Stoneburner | 346/75 X |
| 3,970,222 | 7/1976 | Duffield | 346/75 X |
| 4,031,561 | 6/1977 | Paranjpe | 346/1.1 |
| 4,042,937 | 8/1977 | Perry et al. | 346/1.1 |
| 4,080,608 | 3/1978 | Stoneburner et al. | 346/75 |
| 4,238,805 | 12/1980 | Paranjpe et al. | 346/75 |
| 4,240,082 | 12/1980 | Yu | 346/75 |
| 4,286,272 | 8/1981 | Schwob | 346/75 |
| 4,319,251 | 3/1982 | Keur | 346/1.1 |

FOREIGN PATENT DOCUMENTS

| | | | |
|---|---|---|---|
| 55-124666 | 9/1980 | Japan | 346/75 |

*Primary Examiner*—Donald A. Griffin
*Attorney, Agent, or Firm*—Biebel, French & Nauman

[57] ABSTRACT

An ink jet fluid system and process of startup and shutdown is provided which includes a print head having a fluid manifold and at least one orifice for forming a jet drop printing stream. Inlet and outlet valves are connected to inlet and outlet openings of the print head. During shutdown, fluid is continuously circulated around the print head through a bypass line while the outlet of the print head is connected to a source of reduced pressure to prevent fluid from flowing through the orifice. At startup, the inlet and outlet valves are actuated to provide a continuous flow of fluid under pressure to the print head. In another embodiment of the invention, a fluid system is provided for a multiple print head device and provides for independent control of the fluid pressure in each print head.

21 Claims, 2 Drawing Figures

FLUID SYSTEM FOR FLUID JET PRINTING DEVICE

BACKGROUND OF THE INVENTION

The present invention relates to an ink jet fluid system, and more particularly, to a system and process for the startup and shutdown of the print head of an ink jet printer including a system and process for maintaining independent control of the fluid pressure within individual print heads in a multiple print head device.

Ink jet printers are known in which ink is supplied at a pressure in excess of atmospheric pressure to a manifold communicating with a series of small diameter orifices. As the ink flows through the orifices under pressure, it forms fine filaments of fluid which break up into jets of discrete drops. At the point at which the drops break away from the filaments, they pass through electrically conductive charging rings to which charging potentials are selectively applied to charge selected ones of the drops. An electrostatic deflecting field, extending across the paths of the jet drop streams, deflects the charged drops away from their initial trajecturies in amounts which correspond to their levels of charge. A catcher is positioned for catching those drops traveling along predesignated catching trajectories. Those drops which are not caught are deposited upon a print receiving medium which is transported beneath the printer.

The startup, control, and shutdown of the pressurized ink systems in such ink jet printers without excessive weeping or splattering of ink over the system components or onto the print receiving medium has long been a difficult goal to achieve. During the operation of such printers, the fluid supplied to the manifold must be maintained at a pressure in excess of atmospheric pressure in order to produce the necessary flow of fluid through the orifices to form the jet stream filaments. If a multiple print head system is utilized, such as the system taught by Taylor et al, U.S. Pat. No. Re. 28,219, there is a need to maintain substantially equal pressures in each print head during operation so that drop generation remains correlated to predetermined operating parameters.

At startup, if the flow of ink to the orifices is commenced by simply opening a supply line to an empty manifold, it will require a finite time period before normal operating pressure is reached. During that time, ink will initially weep from each orifice and form pendulous masses of material along the bottom of the orifice plate. As pressure increases inside the manifold, uncontrolled jets of ink will finally be expelled from the orifices, stabilizing only after the excess ink along the underside of the orifice plate is carried away by entrainment with the jets.

At shutdown, the opposite problem occurs. If the ink supply to the manifold is merely turned off, pressure will gradually decrease collapsing the flowing jets of ink and concluding with the dribbling of ink from the orifices. Obviously, ink spattering will occur which can cause electrical shorts, burnouts, and ink residue buildup on parts.

Various efforts have been made in the prior art to solve the problems of startup and shutdown. Examples are Culp, U.S. Pat. No. 3,618,858, which teaches the use of open-sided charge electrodes which are moved out of the way during startup and shutdown; Stoneburner, U.S. Pat. No. 3,891,121, which teaches pumping air into the manifold at a high pressure, following the air with a flushing fluid, and then following the flushing fluid with the ink at startup and switching from ink to a flushing fluid and then evacuating the manifold at shutdown; Perry et al, U.S. Pat. No. 4,042,937, which teaches the build up of an initial large pressure behind an inlet valve to the ink manifold which is then opened for startup and the simultaneous closing of the inlet valve and opening of an outlet valve connected to a source of vacuum during shutdown; and Yu, U.S. Pat. No. 4,240,082, which teaches the delayed opening of an outlet valve to a source of vacuum during shutdown.

However, none of the prior art procedures have proved entirely satisfactory entailing the use of additional hardware, prolonged startup and shutdown times, and/or the need for purging procedures to remove air and contaminants from the ink supply manifold. Accordingly, there remains a need in the art for a fluid system in an ink jet printer which provides for both a rapid and clean startup and shutdown while maintaining operating pressures in the print head or heads within predetermined limits.

SUMMARY OF THE INVENTION

The ink jet fluid system of the present invention includes a print head with a fluid inlet and a fluid outlet and which has a fluid manifold communicating with at least one jet orifice. A printing fluid such as ink is supplied to the manifold under pressure and flows through the jet orifice forming a jet drop printing stream. The system also includes means for supplying a printing fluid to the print head and includes a storage tank, a fluid supply line, a pump in the fluid supply line, and a fluid supply return line communicating with the storage tank.

An inlet valve which is positioned in the fluid supply line near the fluid inlet controls the flow of fluid into the fluid manifold. During periods of shutdown when no printing is being performed, the inlet valve directs fluid through a line bypassing the fluid manifold in the print head and which is connected to the fluid supply return line. Fluid is continuously circulated through the system even during periods of shutdown to keep any particulate matter in the printing fluid from settling in the lines. Moreover, since the fluid is heated to maintain optimum printing characteristics, its continuous circulation through the bypass line, which is in close proximity to the fluid manifold, maintains the print head in a warm and ready state for printing.

An outlet valve, located near the fluid outlet from the manifold connects the manifold, during periods of shutdown, to a source of reduced pressure which maintains the fluid in the manifold at a pressure less than atmospheric so that fluid will not flow through the orifice. This source of reduced pressure can be a siphon line having a downwardly extending portion which supports a column of fluid such as the arrangement shown in commonly assigned copending U.S. application Ser. No. 171,594, filed July 23, 1980, a J-tube, or a source of vacuum such as a pump. Preferably, a siphon line or J-tube is utilized because it will be operable even during a power failure in the system. The source of reduced pressure may be vented to the atmosphere and is connected to the fluid supply return line to return any excess fluid from the manifold to the fluid storage tank.

At startup, both the inlet and outlet valves are moved from their previous positions to positions which direct a flow of fluid under pressure through the fluid manifold.

This may be done simultaneously or the inlet valve may be actuated just prior to actuation of the outlet valve. An adjustable flow impedance device such as an adjustable pressure needle valve is located in the fluid supply return line downstream from the fluid outlet and is adjusted to maintain proper operating pressure in the manifold while permitting a continuous flow of fluid through the manifold. The excess fluid from the manifold is collected in the fluid supply return line and returned to the fluid storage tank where it can then be recirculated through the system. This cross-flow of fluid through the manifold during printing prevents the settling of any particulate matter in the lines or manifold.

In the event that air becomes trapped in the fluid manifold, a bleeding procedure is provided in which the inlet valve is activated to provide a flow of fluid under pressure to the fluid manifold. The outlet valve is then briefly moved to a position in which the fluid outlet is reconnected to the source of reduced pressure. This will cause any air trapped in the manifold to be removed and vented to the atmosphere. The outlet valve is then returned to its previous position, and printing is commenced.

Printing is terminated at shutdown by the simultaneous movement of both the inlet and outlet valve to their shutdown positions. The flow of fluid to the manifold ceases as the fluid is directed through the bypass line by the inlet valve. The fluid outlet is connected to a source of reduced pressure by the outlet valve, and the pressure in the manifold is immediately reduced to below atmospheric pressure. This results in the rapid termination of fluid flow through the orifice achieving clean shutdown.

In another embodiment of the invention, a fluid system for a multiple print head jet printer is provided in which fluid is supplied from a fluid storage tank via a pump to a main fluid supply line. Fluid is supplied to each head of a plurality of print heads through individual supply lines connected in parallel to the main supply line. In each individual supply line, there is positioned a fixed fluid flow impedance device such as a partially-closed valve or physical constriction which acts as a flow restrictor and which is designed to provide fluid to each print head at a substantially constant pressure.

As previously described, each print head has a fluid manifold, a fluid inlet, a fluid outlet, and at least one jet orifice all communicating with the fluid manifold. Individual fluid return lines, each connected to the respective fluid outlet of a print head, empty into a main fluid return line which is in turn connected to the fluid storage tank. In each individual return line, there is positioned an adjustable fluid flow impedance device such as an adjustable needle valve. Adjustment of one fluid flow impedance device in an individual return line will cause a pressure change only in the corresponding print head and does not affect the pressures maintained in the other print heads. In this manner, the fluid pressure in each print head may be independently controlled.

Accordingly, it is an object of the present invention to provide a fluid system for an ink jet printer which permits both a rapid and clean startup and shutdown while maintaining operating pressures in the print head or heads within predetermined limits. It is a further object of the invention to provide a fluid system for a multiple head ink jet printer in which the pressure in individual print heads may be independently controlled. These and other objects and advantages of the invention will become apparent from the following description, the accompanying drawings, and the appended claims.

DESCRIPTION OF THE PREFERRED EMBODIMENTS

Figure 1:
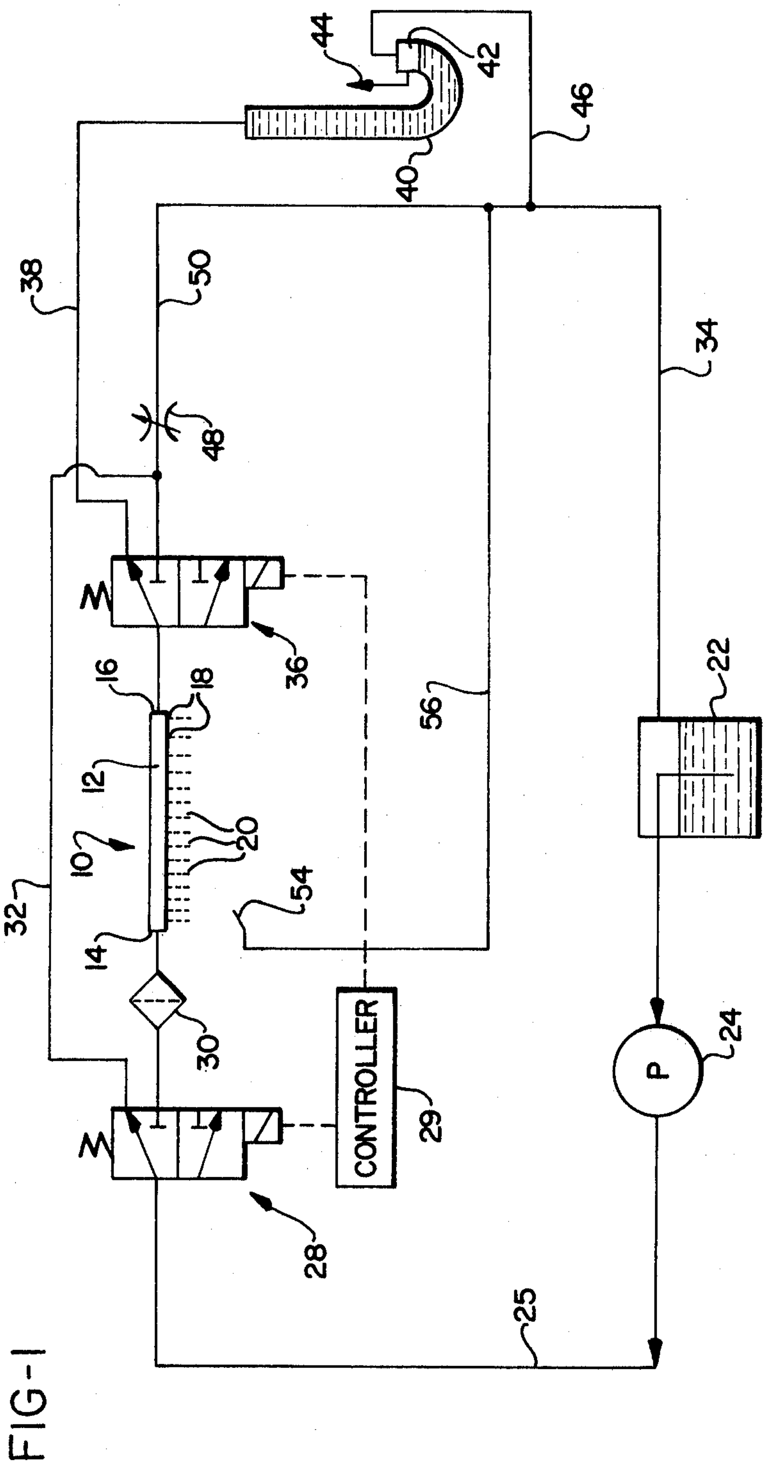
FIG. 1 is a diagrammatic view of an ink jet printer, including a fluid system, in accordance with the present invention.

With reference to FIG. 1, which illustrates one embodiment of the present invention, the fluid system includes a print head 10 having a fluid manifold 12 which contains a fluid to be printed such as ink. Print head 10 has a fluid inlet 14 and a fluid outlet 16 communicating with manifold 12. Print head 10 further includes one or more orifices 18 communicating with manifold 12 such that the fluid supplied to the manifold under pressure flows through the one or more orifices 18 and emerges from the print head as one or more jet drop streams 20.

The print head 10 is illustrated diagrammatically. It should be understood that any of a number of known print head constructions may be utilized including the constructions shown in Stoneburner, U.S. Pat. Nos. 3,891,121, Van Breemen et al, 4,080,607, or Mathis, 3,701,998. The specific structure and operation of such print heads are well known in the art and need not be discussed in further detail.

The fluid supply system shown in FIG. 1 also includes a fluid storage tank 22 which provides a source of printing fluid to print head 10. Fluid under pressure is supplied by pump 24 through fluid supply line 25, inlet valve 28, and filter 30 to fluid inlet 14 in print head 10. Inlet valve 28 is illustrated schematically as an electrically actuated solenoid valve since, in a preferred embodiment of the invention, automatic control of the print head is provided by controller 29. However, it will be appreciated that inlet valve 28 may be operated manually or in any other suitable manner such as by hydraulic or pneumatic actuation. Preferably, filter 30 is positioned in the fluid supply line immediately upstream from print head 10 to remove any undesirable particulate matter from the fluid.

Inlet valve 28 is positioned as shown in FIG. 1 during periods of shutdown when no printing is being performed. In its unactuated position, valve 28 directs the fluid from line 25 through bypass line 32 where it is eventually returned, via fluid supply return line 34 to storage tank 22. This bypass loop provides for a continuous circulation of fluid through the system to keep any undesirable particulate matter from settling out of the fluid supply and return lines during periods of printer shutdown. The continuous circulation of fluid, which has been heated (by means not shown) to an optimum performance temperature of approximately 40° C., also aids in keeping the associated print head structure warm and in a ready condition for printing.

The fluid system also includes an outlet valve 36 which connects manifold 12 in print head 10 during periods of shutdown to a source of reduced pressure through a first fluid return line 38. The source of reduced pressure maintains the fluid in manifold 12 at a pressure less than atmospheric so that fluid will not flow out of print head 10. This source of reduced pressure may be a J-tube 40, as shown, having a downwardly extending portion which supports a column of fluid. Alternatively, the source of reduced pressure may be a siphon line having a valving arrangement such as that shown in commonly assigned U.S. application Ser. No. 171,594, filed July 23, 1980. In yet another alternative embodiment, the source of reduced pressure may be a pump or the like which operates to produce a vacuum.

J-tube 40 has an upwardly extending leg portion 42 in which any air in the system is collected and vented to the atmospheric via line 44. Fluid passing through the J-tube is ultimately returned to fluid supply return line 34 via connecting line 46. The means for providing a source of reduced pressure to print head 10 is preferably mechanical in nature since it will function to prevent fluid from leaving orifices 18 even during a power failure. Preferably, the source of reduced pressure is selected to provide a vacuum sufficient to prevent the flow of fluid through orifices 18 but insufficient to cause air or other contaminants to be sucked into manifold 12 during periods of shutdown.

At startup, both inlet valve 28 and outlet valve 36 are actuated by controller 29 from the positions shown in FIG. 1 to positions which direct a continuous flow of fluid under pressure through manifold 12. Such actuation may be simultaneous, or alternatively, inlet valve 28 may be actuated several milliseconds prior to the actuation of outlet valve 36. An adjustable flow impedance device 48 such as an adjustable pressure needle valve is located in a second fluid return line 50 downstream from fluid outlet 16 of manifold 12. Flow impedance device 48 may be adjusted to maintain proper operating pressure in manifold 12 (preferably between 20–45 psia) while permitting a continuous cross-flow of fluid through the manifold.

This cross-flow of fluid through the supply and return lines and manifold keeps particulate matter flushed out of the lines and prevents it from settling out and clogging the lines or orifices 18. Preferably, a fluid flow ratio of fluid flowing through the manifold to fluid flowing out the orifices is maintained at at least 2:1, and desirably 5:1 or even higher.

The excess fluid flowing through manifold 12 passes through adjustable impedance device 48 and is collected in fluid supply return line 34. Fluid drops comprising jet drop streams 20 are used to print as is conventional in jet printing devices. Unused fluid drops are caught in catcher 54 and returned through catcher return line 56 to fluid supply return line 34. From there, the fluid is returned to fluid storage tank 22 where it can be recirculated to the system.

At startup, it may be desirable to bleed any air which has accumulated and become trapped in manifold 12 from the system. This is accomplished by causing controller 29 to momentarily deactivate outlet valve 36 from its operational position back to its position illustrated in FIG. 1. The combination of fluid being supplied under pressure from inlet 14 and the source of reduced pressure provided by J-tube 40 to outlet 16 causes air to be removed from manifold 12 through first fluid return line 38. The air is eventually vented from the system by vent 44. Printing can then be commenced by reactivating outlet valve 36 to its operational position.

Printing is terminated at shutdown by controller 29 causing the simultaneous movement of both inlet valve 28 and outlet valve 36 to their shutdown positions as shown in FIG. 1. The flow of fluid to print head 10 immediately ceases and is redirected through bypass line 32. Fluid outlet 16 is connected, through outlet valve 36, to reduced pressure source 40, and the fluid pressure in manifold 12 is immediately reduced to below atmospheric pressure. This results in the flow of fluid through the orifices 18 terminating without spattering or weeping of fluid. Preferably, the resistance to fluid flow through bypass line 32 approximates the resistance to flow encountered by the fluid flowing through print head 10. This enables shutdown to be accomplished without causing large pressure variations through the remainder of the system.

Figure 2:
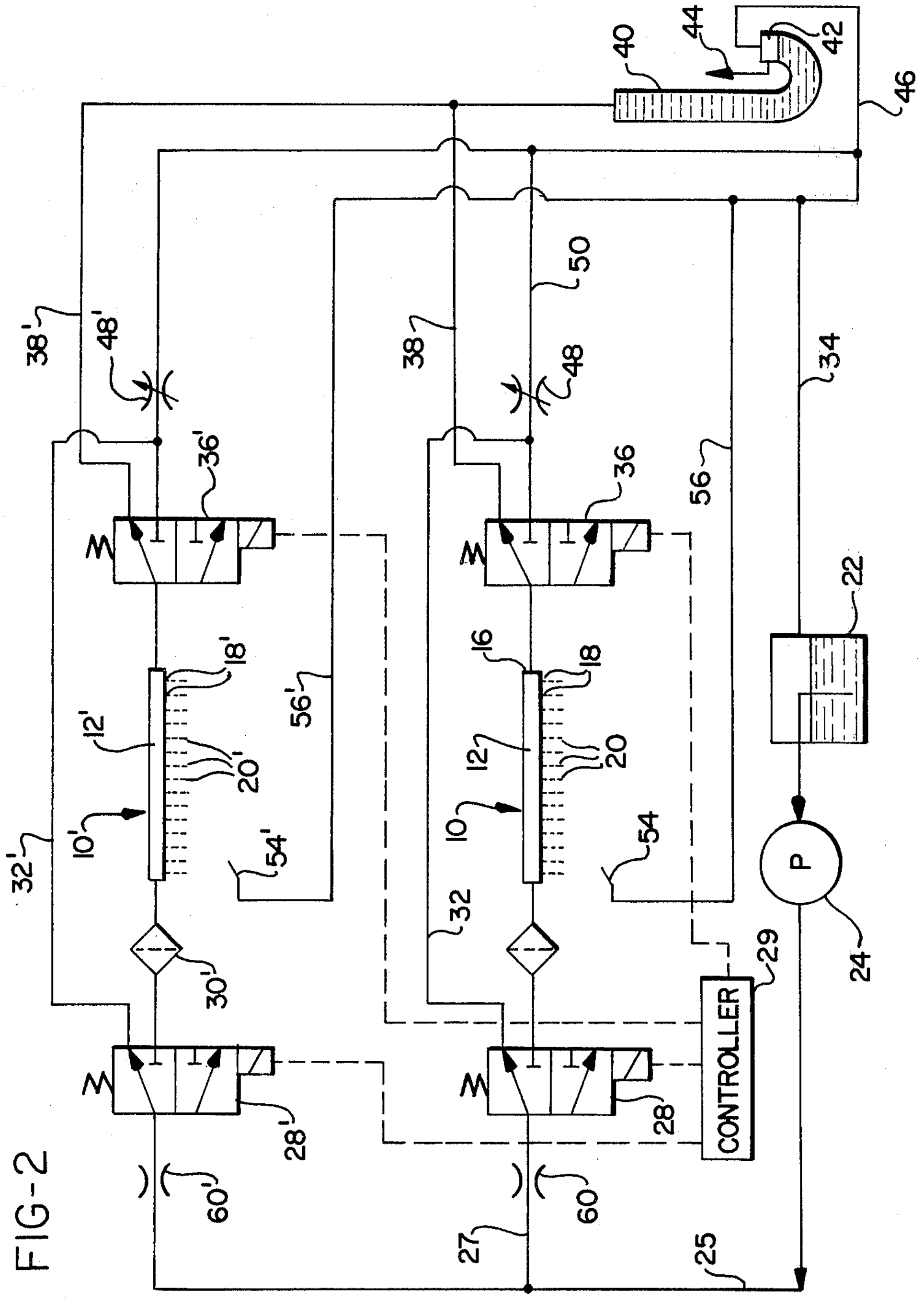
FIG. 2 is a diagrammatic view of another embodiment of the invention with an ink jet printer having more than one print head.

In another embodiment of the invention illustrated in FIG. 2, where like components are represented by using like reference numerals, a fluid system for a multiple print head printer is provided. Although the system is illustrated, for the sake of simplicity and ease of understanding, with two print heads, it will be appreciated that three, four, or more print heads can be utilized in this system using the same type of flow arrangements which are described in more detail below.

Fluid is supplied from a main storage tank 22 via pump 24 to a main fluid supply line 25. Individual supply lines 27, 27', connected in parallel to main supply line 25, supply fluid through inlet valves 28, 28', respectively, to print heads 10, 10'. In each of the individual supply lines 27, 27' there are positioned fixed fluid flow impedance devices 60, 60' upstream from fluid inlets 14, 14', respectively. The impedance devices 60, 60' may be physical constrictions or narrowing of the lines or may be partially closed valves which are designed to provide a substantially repeatable pressure reduction to each respective print head. Preferably, the impedance devices are designed to provide a pressure in manifold 12 and 12' of 20–45 psia.

As described above with the reference to the embodiment of the invention shown in FIG. 1, each print head 10, 10' has a fluid manifold 12, 12', a fluid inlet 14, 14', a fluid outlet 16, 16', and at least one jet orifice 18, 18' all communicating with the fluid manifold. Individual fluid return lines 50, 50' are provided and are connected to the respective outlets 16, 16' of print heads 10, 10'. The fluid flowing through manifolds 12, 12' during printing operations is collected in fluid return lines 50, 50' which empty into main fluid supply return line 34.

As shown in FIG. 2, in each return line 50, 50' there is positioned an adjustable fluid flow impedance device 48, 48'. With the pressure in lines 25 and 34 being maintained substantially constant, adjustment of an individual flow impedance device affects the pressure of the fluid only in the respective print head. That is, adjustment of fluid flow impedance device 48 affects the fluid pressure in the manifold 12 of print head 10. However, the fluid pressure maintained in the manifold 12' of print head 10' will remain unaffected. In this manner, independent adjustment and control of fluid pressure in individual print heads is achieved.

While the apparatus and methods herein described constitute preferred embodiments of the invention, it is to be understood that the invention is not limited to these precise apparatus and methods, and that changes may be made in either without departing from the scope of the invention, which is defined in the appended claims.

What is claimed is:

1. A fluid system for a jet printer, comprising a print head, including a fluid manifold communicating with at least one jet orifice, and having a fluid inlet and a fluid outlet providing for fluid flow into and out of said manifold, respectively, means for supplying fluid to said system including a fluid supply line and a fluid supply return line, a first fluid return line including means for providing reduced pressure in said first fluid return line connected thereto, said reduced pressure providing means being in turn connected to said fluid supply return line, a second fluid return line, connected to said fluid supply return line, a bypass line, connectable to said fluid supply line and said second fluid return line, an inlet valve movable from a first position for connecting said fluid supply line to said bypass line to a second position for connecting said fluid supply line to said fluid inlet of said print head, and an outlet valve movable from a first position for connecting said fluid outlet of said print head to said first fluid return line and said reduced pressure providing means to a second position for connecting said fluid outlet of said print head to said second fluid return line.

2. The fluid system of claim 1 in which said means for supplying fluid to said system further include a fluid storage tank for receiving fluid from said fluid supply return line.

3. The fluid system of claim 2 further including means for withdrawing fluid from said fluid storage tank and delivering fluid to said fluid supply line under pressure.

4. The fluid system of claim 1 in which said inlet valve and said outlet valve each comprise a solenoid actuated valve.

5. The fluid supply system of claim 1 in which said reduced pressure providing means includes a segment connected to said first fluid return line and extending downwardly from said print head supporting a column of fluid and having a vent to atmosphere, whereby when said first fluid return line is connected to said fluid outlet of said print head, a fluid pressure in said fluid manifold is maintained which is less than atmospheric pressure by an amount proportional to the length of said fluid column in said segment.

6. The fluid system of claim 1 further comprising means for simultaneously actuating said inlet valve and said outlet valve to move them both from their first positions to their second positions, respectively, whereby fluid flow from said fluid supply line through said bypass line is terminated and fluid flow from said fluid supply line through said fluid inlet, manifold, and fluid outlet of said print head is initiated, thus producing a fluid jet drop stream emanating from said orifice while providing continuous fluid flow through said fluid reservoir during operation of said jet printer.

7. A method of starting up a jet printer having a print head with a manifold initially filled with a fluid, at least one jet orifice, and having a fluid inlet and a fluid outlet for fluid flow into and out of said manifold comprising the steps of, connecting a source of reduced pressure to said fluid outlet sufficient to prevent the flow of fluid from said at least one orifice, continuously supplying said fluid under pressure from a source of fluid supply to a fluid supply return line while bypassing said fluid inlet and said fluid outlet of said print head, and redirecting said fluid under pressure to said fluid inlet of said print head while disconnecting said fluid outlet from said source of reduced pressure and connecting said fluid outlet to said fluid supply return line, whereby a jet stream of fluid commences flow through said at least one orifice and fluid is continuously supplied through said manifold.

8. The method of claim 7 including the step of adjusting the impedance to fluid flow in said fluid supply return line to adjust the pressure of the fluid in said manifold.

9. The method of claim 7 including the step of reconnecting said fluid outlet to said source of reduced pressure while maintaining said supply of fluid under pressure to said fluid inlet for a time sufficient to bleed any air trapped in said manifold from said manifold.

10. The method of claim 9 including the step of returning any fluid collected with the air bleed from said manifold to said fluid supply return line.

11. The method of claim 7 in which the ratio of the flow of fluid through said manifold to the flow of fluid from said at least one orifice is at least 2:1.

12. A fluid system for a multiple print head fluid jet printer comprising:

a main fluid supply line and a main fluid return line, a plurality of print heads, each having a fluid manifold, a fluid inlet, a fluid outlet and at least one jet orifice, all communicating with said fluid manifold, a plurality of individual fluid supply lines connected in parallel flow relationship with said main supply line and including fixed fluid flow impedance means, said fixed fluid flow impedance means being connected in series between each of said individual fluid supply lines and an associated one of said fluid inlets, and a plurality of individual fluid return lines in parallel flow relationship with said main fluid return line and including respective means for adjusting fluid flow impedance, said means for adjusting fluid flow impedance being connected in series between each of said individual fluid return lines and an associated one of said fluid outlets, whereby adjustment of said means for adjusting fluid flow impedance in a respective fluid return line connected to one of said print heads alters the fluid pressure in said fluid manifold of that respective print head without affecting the fluid pressure of fluid supplied to the other print heads.

13. The fluid system of claim 12 in which said means for adjusting fluid flow impedance comprises an adjustable pressure needle valve.

14. The fluid system of claim 13 including means for providing reduced pressure in said second fluid return lines.

15. The fluid system of claim 14 in which said reduced pressure providing means includes a segment in said second fluid return lines extending downwardly from said print heads, supporting a column of fluid, and having a vent to atmosphere.

16. The fluid system of claim 12 in which said fixed flow impedance means comprises a physical constriction in said fluid supply line.

17. The fluid system of claim 12 including a plurality of second fluid return lines connectable to the respective fluid outlets of said plurality of print heads.

18. The fluid system of claim 17 including a plurality of bypass lines connectable to respective ones of said individual fluid supply lines and second fluid return lines.

19. The fluid system of claim 18 including a plurality of inlet valves in respective ones of said individual fluid supply lines movable from a first position for connecting an individual fluid supply line to a respective bypass line to a second position for connecting said individual fluid supply line to the respective bypass line to a second position for connecting said individual fluid supply line to the respective fluid inlet of a print head.

20. The fluid system of claim 19 including a plurality of outlet valves in respective ones of said individual fluid return lines movable from a first position for connecting a respective fluid outlet of a print head to a respective one of said second fluid return lines and said reduced pressure providing means to a second position for connecting a respective fluid outlet of a print head to a respective individual return line.

21. A method of independently controlling the fluid pressure in the fluid manifold of selected ones of a plurality of print heads connected in parallel to a single fluid supply system, each of said print heads having a fluid inlet connected to said fluid supply line through an associated one of a plurality of fixed fluid flow impedance lines, a fluid outlet connected to said fluid return line through an associated one of a plurality of adjustable fluid flow impedance lines, a fluid manifold communicating with said fluid inlet and said fluid outlet, and at least one jet orifice communicating with said fluid manifold, comprising the step of, adjusting selected ones of said adjustable fluid flow impedance lines to control the fluid pressure in each of the respective print heads.

* * * * *

UNITED STATES PATENT AND TRADEMARK OFFICE

CERTIFICATE OF CORRECTION

PATENT NO. : 4,404,566

DATED : September 13, 1983

INVENTOR(S) : Frederic Lewis Clark, Scott Daniel Ayers

It is certified that error appears in the above-identified patent and that said Letters Patent is hereby corrected as shown below:

In printing claim 19, the phrase "bypass line to a second position for connecting said individual fluid supply line to the respective" was repeated twice in the claim.

Signed and Sealed this

*Third* Day of *January 1984*

[SEAL]

*Attest:*

GERALD J. MOSSINGHOFF

*Attesting Officer* *Commissioner of Patents and Trademarks*